(12) United States Patent
El Batt

(10) Patent No.: US 7,075,902 B2
(45) Date of Patent: Jul. 11, 2006

(54) APPARATUS, METHOD, AND COMPUTER PROGRAM PRODUCT FOR WIRELESS NETWORKING USING DIRECTIONAL SIGNALING

(75) Inventor: Tamer El Batt, Woodland Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 526 days.

(21) Appl. No.: 10/293,213

(22) Filed: Nov. 12, 2002

(65) Prior Publication Data

US 2003/0152086 A1    Aug. 14, 2003

Related U.S. Application Data

(60) Provisional application No. 60/356,411, filed on Feb. 11, 2002.

(51) Int. Cl.
*H04B 7/204* (2006.01)
*H04L 12/413* (2006.01)

(52) U.S. Cl. .................. 370/310; 370/445; 455/25; 342/367

(58) Field of Classification Search ............ 370/445, 370/310; 455/25; 342/350, 367
See application file for complete search history.

(56) References Cited

U.S. PATENT DOCUMENTS

| | | | |
|---|---|---|---|
| 6,791,996 B1 * | 9/2004 | Watanabe et al. | 370/447 |
| 2002/0181492 A1 * | 12/2002 | Kasami et al. | 370/445 |
| 2003/0048770 A1 * | 3/2003 | Proctor | 370/349 |
| 2003/0109285 A1 * | 6/2003 | Reed et al. | 455/562 |

FOREIGN PATENT DOCUMENTS

EP          109669 A        5/2001

OTHER PUBLICATIONS

"Wireless LAN Medium Access Control (MAC) and Physical Layer (PHY) specifications," 1997, Draft Standard IEEE 802.11, P802.11/D1: The editors of IEEE 802.11.
R. Janaswamy, "Radiowave Propagation and Smart Antennas for Wireless Communications," Kluwer Academic Publishers, Boston 2001.
M. Sanchez, T. Giles and J. Zander, "CSMA/CA with Beam Forming Antennas in Multi-hop Packet Radio," Swedish Workshop on Wireless Ad-hoc Networks, Mar. 2001.
V. Bhargavan, A. Demers, S. Shenker, and L. Zhang, "MACAW—A media access protocol for Wireless LANs," ACM SIGCOMM, Sep. 1994.

(Continued)

*Primary Examiner*—Min Jung
(74) *Attorney, Agent, or Firm*—Tope-McKay & Associates

(57) ABSTRACT

The present invention provides a method, apparatus, and a computer program product for selective directional wireless communication. The apparatus comprises a computer system with a directional communication module. The present invention takes advantage of directional antennas in order to optimize wireless communication by minimizing interference with neighboring nodes. The technique presented is a CSMA/CA-based reservation protocol that improves the multiple access throughput of a wireless ad-hoc network by efficiently utilizing the interference reduction feature of switched-beam antennas by balancing the number of neighbors that need to back-off and the number of control/data packet collisions.

9 Claims, 7 Drawing Sheets

OTHER PUBLICATIONS

T-S Yum and K-W Hung, "Design algorithms for multi-hop packet radio networks with multiple directional antenna systems," IEEE Transactions on Communications, vol. 40, No. 11, pp. 1716-1724, 1992.

Y. Ko, V. Shankardumar and N. Vaidya, "Medium Access Control Protocols Using Directional Antennas in Ad Hoc Networks," IEEE INFOCOM, Apr. 2000.

A. Nasipuri, S. Ye, J. You and R. Hiromoto, "A MAC Protocol for Mobile Ad Hoc Networks Using Directional Antennas," IEEE WCNC, 2000.

C. Lau and C. Leung, "A slotted ALOHA packet ratio networks with multiple antennas and receivers," IEEE Transactions on Vehicular Technology, vol. 39, No. 3, pp. 218-226, 1990.

M. Horneffer and D. Plassmann, "Directed Antennas in the Mobile Broadband System," IEEE INFOCOM, pp. 704-712, Apr. 1996.

J. Ward and R. Compton, "Improving the Performance of a Slotted ALOHA Packet Radio Network with an Adaptive Array," IEEE Transactions on Communications, vol. 40, No. 2, pp. 292-300, 1992.

C. Sakr and T. Todd, "Carrier-sense protocols for packet-switched smart antenna basestation," IEEE ICNP, 1997.

F. Shad, T. Todd, V. Kezys and J. Litva, "Dynamic Slot Allocation (DSA) in Indoor SDMA/TDMA Using a Smart Antenna Basestation," IEEE/ACM Transactions on Networking, vol. 9, No. 1, pp. 69-81, 2001.

N. Pronios, "Performance considerations for slotted spread-spectrum random access networks with directional antennas," IEEE GLOBECOM, Nov. 1989.

J. Zander, "Slotted ALOHA multihop packet radio networks with directional antennas," IEEE Electronics Letters, vol. 26, No. 25, 1990.

C. Balanis, J. Aberle, J. Capne, T. Duman, S. El-Ghazaly, A. Spanias and T. Thornton, "Smart Antennas for Future Reconfigurable Wireless Communication Networks," Arizona State University Technical Report, Apr. 2000.

R. Ramanathan, "On the Performance of Ad Hoc Networks with Beamforming Antennas," ACM Mobihoc, Oct. 2001.

Young-Bae Ko, et al., "Medium access control protocols using directional antennas in ad hoc networks," INFOCOM 2000, Nineteenth Annual Joint Conference of the IEEE Computer and Communications Societies. Israel Mar. 26-30, 2000. XP010376001.

Nasipuri A, et al., "A MAC protocol for mobile ad hoc networks using directional antennas" IEEE Wireless Communications and Networking Conference (WCNC2000), Chicago, Sep. 2000, pp. 1214-1219, XP010532719.

* cited by examiner

APPARATUS, METHOD, AND COMPUTER PROGRAM PRODUCT FOR WIRELESS NETWORKING USING DIRECTIONAL SIGNALING

PRIORITY CLAIM

This application claims the benefit of priority to the provisional application 60/356,411, titled Multiple Access Protocol for Wireless Ad-hoc Networks Using Switched Beam Antennas, filed with the United States Patent and Trademark Office on Feb. 11, 2002.

BACKGROUND (1) Technical Field

The present invention relates to a technique for network communications. More specifically, the present invention relates to the use of directional communication nodes that send communication signals in specific directions to minimize interference with those of other nodes.

(2) Discussion

Wireless ad-hoc networks are widely used for setting up networks on the fly in geographic areas that lack, or can not support, traditional of communication infrastructures, e.g. battlefield and disaster relief sites (such as earthquakes and wildfires) that need extensive communication and coordination among wireless terminals. Due to the broadcast nature of omni-directional antennas, multi-user interference constitutes a major hurdle to efficient utilization of the scarce wireless bandwidth. Thus, coordinating the transmissions of independent users such that they can access their next-hop neighbors without destroying each other's signal is the fundamental multiple access problem in wireless ad-hoc networks. Various multiple access protocols have been introduced in the literature assuming omni-directional antennas. Recently, there has been overwhelming evidence that utilizing directional antennas can significantly improve the performance of cellular as well as wireless ad-hoc networks. These potential improvements are made possible by the following attractive features offered by directional antennas:

Interference reduction, made possible by focusing the transmitted power toward the intended neighbor and minimizing it in unintended transmission directions (e.g. directions of unintended neighbors).

Transmission range extension, made possible because focusing transmission power in a specific direction in space increases the reach of the transmitter compared with the case of emitting the same amount of power equally in all directions (e.g. the omni-directional case).

Low probability of detection, made possible because the transmitter is emitting power in a specific direction for a period of time, rather than in all directions all the time.

Low probability of interception, made possible because it is more difficult for an interceptor to jam the transmission of a node using directional antenna.

In the multiple access problem, there are two fundamental sub-problems that are affected by the use of directional antennas:

Neighbor Discovery: Neighbor discovery schemes are based on broadcast messages from a node to all of its neighbors to either inquire about their identities or to announce its existence via a unique identifier (UID). It is noteworthy that a broadcast message can be delivered to all neighbors via a single omni-directional channel. However, in a case where directional antennas are used, issues arise as to how to efficiently perform neighbor discovery using directional antennas, and how to account for the trade-offs involved in performing neighbor discovery using directional antennas versus omni-directional antennas.

Spatial Reuse (channel reservation): The scenarios shown in FIG. 1 and FIG. 2, discussed in the background above, emphasize the role of directional antennas in improving spatial reuse. In FIG. 1, it may be seen that a pair of transmissions, e.g. those between nodes S and D and between nodes 2 and 10 suffer from interference in the case of omni-directional antennas (shown in FIG. 1). However, this interference can be effectively eliminated via the interference reduction feature of directional antennas, as depicted in FIG. 2. Hence, the potential MAC throughput of an ad-hoc network may be increased using directional antennas.

Several multiple access techniques (protocols) have been introduced in the literature for wireless ad-hoc networks. A sampling of these is provided in the list of references at the end of this discussion. Most of the references listed describe variations of the CSMA/CA protocol that are modified to cope with the inherent hidden terminal problem. There have been several attempts to introduce multiple access protocols to ad-hoc networks that utilize directional antennas. The work in "Slotted ALOHA multihop packet radio networks with directional antennas" by J. Zander provides a performance analysis study that shows the impact of directional antennas on the performance of slotted ALOHA. On the other hand, the work in "Design algorithms for multi-hop packet radio networks with multiple directional antenna systems" by T-S Yum and K-W Hung introduces a multiple access protocol that minimizes interference by using a group of tones to identify the active neighbors. Other research efforts have attempted to modify the request to send/clear to send (RTS/CTS) handshake mechanism of CSMA/CA protocols to efficiently utilize the interference reduction feature of directional antennas. Still other works have considered specific types of directional antennas, namely "switched beam antennas" that consist of several fixed and predefined beams formed usually with antenna arrays. On the other hand, some works have also considered both switched beam and steerable beam antennas.

In "Medium Access Control Protocols Using Directional Antennas in Ad Hoc Networks" by Y. Ko, V. Shankarkumar and N. Vaidya, the authors assume that each node knows which beam should be used in order to reach a specific neighbor. They also assume that transmissions received by two or more beams on the same node could interfere with each other. They provided two approaches for modifying the CSMA/CA protocol. In the first approach, they considered sending RTS packets in the direction of the destination only (directionally, or D-RTS for short), whereas CTS packets were transmitted in all directions (omni-directionally, or O-CTS for short). There are two major limitations in this protocol. The first, which was indicated by its authors, stems from the fact that D-RTS packets do not reach some neighbors of the source node, which might cause control packet collisions at the source node S (as depicted in FIG. 2), because of attempts to transmit to S or to a neighbor covered by the same beam pointing toward S. To resolve this conflict, the authors proposed a second approach that utilizes both D-RTS and O-RTS (omni-directionally, or O-RTS for short). The authors proposed starting with D-RTS and then switching to O-RTS if collisions arise. However, this solution is inefficient since it does not minimize either the number of control packet collisions caused by neighbors of the source node or the number of nodes that back off unnecessarily. This is primarily due to the tradeoff between using D-RTS packets (which minimize the number of nodes that need to back off) and O-RTS packets (which minimize the number of control packet collisions of the type mentioned previously). The second limitation is due to the fact that sending O-RTS packets to all neighbors, without distinguishing nodes that suffer interference during the directional data transmission, and nodes that do not, could lead to further collisions at a node. Neighbors that lie within the intended direction of data transmission may need to block some, or all, beams from transmission due to the interference they may suffer from the directional data transmission due to multipath fading. On the other hand, neighbors outside of that region need to block only the beam pointing toward the neighbor involved in the transmission. The same argument applies to the O-CTS packets, which do not differentiate between nodes that lie within the direction of acknowledgement (ACK) transmissions and nodes that do not.

In "A MAC Protocol for Mobile Ad Hoc Networks Using Directional Antennas", by A. Nasipuri, S. Ye, J. You and R. Hiromoto, the authors assume that mobile nodes do not have any location information about their neighbors. Additionally, they employ selection diversity where the receiver uses the signal from the antenna that is receiving the maximum power. They propose to jointly solve the problems of neighbor location discovery and channel reservation. The approach taken is based on sending RTS and CTS packets in all directions, whereas data and acknowledgement packets are sent directionally. The limitation of this approach is that the channel reservation packets, namely the RTS and CTS packets, are sent in all directions, which, in turn, leads to the same problem as is present in plain CSMA/CA; that is, blocking neighbors unnecessarily. The primary reason behind this shortcoming is the authors' attempt to solve the problems of neighbor location discovery and channel reservation simultaneously. While this could have the advantage of reducing the protocol overhead, it could lead to severe degradation in multiple access throughput.

In "CSMA/CA with Beam Forming Antennas in Multihop Packet Radio" by M. Sanchez, T. Giles and J. Zander, the authors introduced a number of beam selection policies for CSMA/CA based protocols. First, they proposed the use of omni-directional antennas to send RTS packets (O-RTS), while use directional beams to feedback CTS packets (D-CTS). Based on the previous discussion, it is evident that this protocol suffers the following two drawbacks that significantly affect its throughput: i) using omni-directional RTS packets leads to blocking neighbors unnecessarily; and ii) using D-CTS packets could lead to other neighbors transmitting to the destination, hence causing data packet collisions. The authors also proposed to use D-RTS to resolve the problems of unnecessarily blocking neighbors. Again, this leads to the possibility of neighbors causing control packet collisions at the source node. Although, the proposed protocols achieve performance gains over plain CSMA/CA, they do not guarantee an optimal balance between unnecessary neighbors' back off and collisions tradeoff.

In "Smart Antennas for Future Re-configurable Wireless Communication Networks" by C. Balanis, J. Aberle, J. Capone, T. Duman, S. El-Ghazaly, A. Spanias and T. Thornton, the authors assumed very narrow beam-widths, almost like pencil-beam antenna patterns. Although this assumption may not be practical, the multiple access problem is resolved, from the authors' perspective, via the narrow beam assumption. However, the authors employ the IEEE 802.11 handshake mechanism (RTS/CTS) mainly for location discovery, not for reserving the channel. Thus, this is essentially a neighbor location discovery scheme based on the RTS/CTS handshake packets. However, pencil-beams are generally impractical since beam widths depend on several factors among which are the frequency band and data rate. The authors assert that if the smart antennas are not highly directional, neighboring nodes could cause interference to an ongoing transmission since no channel reservation is made.

Generally, a neighbor is said to be blocked if at least one of its beams is blocked from transmission due to overhearing a channel reservation packet (either RTS or CTS) from neighbor. On the other hand, a neighbor is said to be unblocked if it does not hear any channel reservation packet and, hence, is completely unaware of the ongoing reservation attempt. These unblocked neighbors can initiate a channel reservation request independently and cause interference (collisions) to the ongoing transmission. The set of nodes within the geographic area covered by the transmission radiation pattern of an omni-directional antenna at node x is denoted as a set of neighbors $N(x)$. The set of blocked neighbors of node x is denoted as $BN(x)$, while the set of unblocked neighbors is denoted as $UBN(x)$. This terminology will be used in the case where directional antennas are employed. To begin with however, in review, the scenario shown in FIG. 1 depicts a case where all signals are transmitted omni-directionally (i.e., handshake packets are sent in all directions). This case is referred to as "omni-directional blocking". In this case, node S wishes to initiate a transmission to node D. Thus, it proceeds by sending an O-RTS (omni-directional request to send) packet and node D responds by an O-CTS (omni-directional clear to send) packet that confirms the reservation to S. For this scenario, it is straightforward to see that the neighbor sets of nodes S and D are given by $N(S)=\{1, 2, 3, 4, 5, 6, D\}$ and $N(D)=\{1, 4, 5, 6, 7, 8, 9, S\}$, respectively. In this case, the set of blocked neighbors includes all neighbors and the set of unblocked neighbors is empty, i.e. $BN(S)=N(S)$; $UBN(S)=\{\ \}$; $BN(D)=N(D)$; and $UBN(D)=\{\ \}$. This is due to the fact that the reservation packets are sent in all directions and hence all neighbors become aware of the ongoing transmission and refrain from transmission. This scheme is only favorable if a neighbor's transmission causes interference to the ongoing transmission (e.g. node 5 transmitting to node 6 causes collision at D). However, if the neighbor wishes to transmit data, in a directional manner, to another node such that it will not cause interference to the ongoing transmission (e.g., node 2 sending to node 10, or node 8 sending to node 11), it will be blocked unnecessarily. This, in turn, degrades the multiple access throughput and illustrates the drawbacks of plain CSMA/CA protocols due to the fact that they do not utilize the interference reduction feature of directional antennas to the full extent. This is referred to herein as the "unnecessary blocking" problem.

To resolve the "unnecessary blocking" problem caused by omni-directional reservations, several directional reservation schemes have been introduced in the literature, some of which were previously mentioned. The scenario depicted in FIG. 2, shows a node setting similar to that of FIG. 1. To gain more insight about the design tradeoffs, FIG. 2 presents the other extreme, where handshake packets are sent strictly in a directional manner (D-RTS/D-CTS). This case is referred herein to as "directional blocking". Assume a transmission scenario similar to the one considered earlier where node S wishes to initiate a transmission to node D. Thus, it sends a D-RTS and node D responds by sending a D-CTS that confirms the reservation to S. In this case, it is straightforward to notice that BN(S)={4, 5,6, D}; UBN(S)={1, 2, 3}; BN(D)={4, 5, S}; and UBN(D)={1, 6, 7, 8, 9}. Unlike the case of omni-directional reservation depicted in FIG. 1, neighbors are partitioned between the two groups due to the fact that the reservation packets are sent directionally, and hence some neighbors are aware of the ongoing transmission while others are not. Clearly, there is a tradeoff, between the possibility of collisions caused by unblocked neighbors and the number of unnecessarily blocked neighbors, associated with the directional reservation approach. Thus, a neighbor knowing about an ongoing transmission may degrade performance, because of unnecessary blocking (e.g. node 2 sending to node 10, or node 8 sending to 11), while another neighbor not knowing about an ongoing transmission could degrade performance as well, because of the possibility of collisions (e.g. node 2 sending to node S, or node 6 sending to D). This tradeoff cannot be solved by either of the aforementioned two extremes.

To this end, it is important to note that the two handshaking extremes, namely omni-directional handshaking and directional handshaking, are inefficient. This is due to the fact that omni-directional handshaking can lead to unnecessary blocking of neighboring nodes that wish to transmit in a different direction. On the other hand, directional handshaking solves the problem of blocking neighbors unnecessarily. However, it can lead to the case where some neighbors are left unaware of the ongoing transmission, and can lead to packet collisions.

Because of the shortcomings present in the state of the art, a need exists for a technique for overcoming the limitations inherent in both strictly omni-directional and strictly directional handshaking routines.

(3) REFERENCES

[1] "Wireless LAN Medium Access Control (MAC) and Physical Layer (PHY) specifications," 1997. Draft Standard IEEE 802.11, P802.11/D1: The editors of IEEE 802.11

[2] V. Bhargavan, A. Demers, S. Shenker, and L. Zhang, "MACAW—A media access protocol for Wireless LANs", *ACM SIGCOMM*, September 1994.

[3] C. Lau and C. Leung, "A slotted ALOHA packet radio networks with multiple antennas and receivers," *IEEE Transactions on Vehicular Technology*, vol. 39, no. 3, pp. 218–226, 1990.

[4] M. Horneffer and D. Plassmann, "Directed Antennas in the Mobile Broadband System," *IEEE INFOCOM*, pp.704–712, April 1996.

[5] J. Ward and R. Compton, "Improving the Performance of a Slotted ALOHA Packet Radio Network with an Adaptive Array," *IEEE Transactions on Communications*, vol. 40, no. 2, pp. 292–300, 1992.

[6] C. Sakr and T. Todd, "Carrier-sense protocols for packet-switched smart antenna basestation," *IEEE ICNP*, 1997.

[7] F. Shad, T. Todd, V. Kezys and J. Litva, "Dynamic Slot Allocation (DSA) in Indoor SDMA/TDMA Using a Smart Antenna Basestation," *IEEE/ACM Transactions on Networking*, vol. 9, no. 1, pp. 69–81, 2001.

[8] N. Pronios, "Performance considerations for slotted spread-spectrum random access networks with directional antennas," *IEEE GLOBECOM*, November 1989.

[9] J. Zander, "Slotted ALOHA multihop packet radio networks with directional antennas," *IEEE Electronics Letters*, vol. 26, no. 25, 1990.

[10] T-S Yum and K-W Hung, "Design algorithms for multi-hop packet radio networks with multiple directional antenna systems," *IEEE Transactions on Communications*, vol. 40, no. 11, pp. 1716–1724, 1992.

[11] Y. Ko, V. Shankarkumar and N. Vaidya, "Medium Access Control Protocols Using Directional Antennas in Ad Hoc Networks," *IEEE INFOCOM*, April 2000.

[12] A. Nasipuri, S. Ye, J. You and R. Hiromoto, "A MAC Protocol for Mobile Ad Hoc Networks Using Directional Antennas," *IEEE WCNC*, 2000.

[13] M. Sanchez, T. Giles and J. Zander, "CSMA/CA with Beam Forming Antennas in Multi-hop Packet Radio," *Swedish Workshop on Wireless Ad-hoc Networks*, March 2001.

[14] C. Balanis, J. Aberle, J. Capone, T. Duman, S. El-Ghazaly, A. Spanias and T. Thornton, "Smart Antennas for Future Re-configurable Wireless Communication Networks," *Arizona State University Technical Report*, April 2000.

[15] R. Ramanathan, "On the Performance of Ad Hoc Networks with Beamforming Antennas," *ACM Mobihoc*, October 2001.

[16] R. Janaswamy, "Radiowave Propagation and Smart Antennas for Wireless Communications", *Kluwer Academic Publishers, Boston*, 2001.

SUMMARY

The present invention provides an apparatus for selective directional wireless communication. The apparatus comprises a computer system including a processor and a memory coupled with the processor. The apparatus further comprises a directional communication module connected with the processor for transmitting communication signals directionally. There are several directional beams that constitute the plurality of directions, each of which may be blocked or unblocked. The computer system further comprises means, residing in its processor and memory for storing information including the identities of and directions to each neighbor node, and the identity of the apparatus. Additionally, the computer system also comprises means for transmitting, via the directional communication module, a request-to-send signal including a source node identity and a destination node identity, with the source node identity consisting of the identity of the apparatus, the request-to-send signal indicating the start of a transmission. The computer system also comprises means for receiving, via the directional communication module, an clear-to-send signal corresponding to a transmitted request-to-send signal indicating whether to start a data transmission. Furthermore, the computer system comprises means for transmitting, when indicated to do so by the clear-to-send signal, a data transmission corresponding to the transmitted request-to-send signal, in the direction corresponding to the destination node identity. The computer system also comprises means for receiving, an acknowledgement signal either upon completion of the data transmission or after sending the clear-to-send signal indicating not to send a data transmission. The computer system additionally comprises means for receiving, via the directional communication module, a request-to-send signal including a source node identity and a destination node identity, and determining whether the apparatus is the destination node. Further, the computer system comprises means for determining after receipt of a request-to-send signal, and when the apparatus is not the destination node, whether the source node or the destination node are within the communication range of the apparatus, and when the source node is within the communication range of the apparatus, blocking communication signals in the direction of the source node for a predetermined period of time; and when the destination node is within the communication range of the apparatus, blocking communication signals in the direction of the destination node for a predetermined period of time. In addition, the computer system comprises means for transmitting in all unblocked directions, when the apparatus is the destination node, a clear to send signal corresponding to a transmitted request-to-send signal indicating whether to transmit a data transmission. The computer system further comprises means for receiving, when a data transmission was permitted to do so by the transmitted clear-to-send signal, a data transmission corresponding to the received request-to-send signal. In addition, the computer system comprises means for transmitting in all unblocked directions, an acknowledgement signal either upon completion of the data transmission or after sending a clear-to-send signal indicating not to send a data transmission.

In a further aspect, the directional communication module is selected from a group consisting of radio frequency antennas and infrared transceivers.

In a still further aspect, the information stored further comprises an index of a directional beam to be used during data transmission, and an index of a directional beam currently used by a transmitting neighbor during channel reservation.

The present invention may also be embodied as a method, in which the "means" discussed above are interpreted as steps operated on a data processing (computer) system or as a computer program product, in which the "means" discussed above are recorded on a computer readable medium such as an optical storage device (e.g., a CD or DVD).

The "means" of the present invention are generally in the form of program logic that may be embodied as computer program code or may be embedded in hardware depending on the needs of a particular aspect.

BRIEF DESCRIPTION OF THE DRAWINGS

The objects, features and advantages of the present invention will be apparent from the following detailed descriptions of the preferred aspect of the invention in conjunction with reference to the following drawings, where:

In order to provide a working frame of reference, first a glossary of terms used in the description and claims is given as a central resource for the reader. Next, a discussion of various physical aspects of the present invention is provided. Finally, a discussion is provided to give an understanding of the specific details.

(1) Glossary

Before describing the specific details of the present invention, a centralized location is provided in which various terms used herein and in the claims are defined. The glossary provided is intended to provide the reader with a general understanding of the intended meaning of the terms, but is not intended to convey the entire scope of each term. Rather, the glossary is intended to supplement the rest of the specification in more accurately explaining the terms used.

Communication Module—The communication module of the present invention refers generally to a mechanism for transmitting messages between nodes. Typically, the communication module is in the form of a radio-frequency (RF) antenna or an infrared (IR) transmitter/receiver, though other types of wireless communication mechanisms may be used depending on the requirements of a particular aspect.

Current Direction of Transmission—This term refers to the index of the directional beam currently being used for sending the reservation (RTS and CTS) packets, as part of the reservation scheme. The information regarding which beam to use to reach a specific neighbor is determined through the use of a neighborhood location discovery (NLD) scheme. A field is added to the reservation packet to store the index of the directional beam to be used for channel reservation. This information is used by each neighbor to know its relative location with respect to the source and destination nodes so that they can make appropriate beam blocking decisions.

Figure 1:
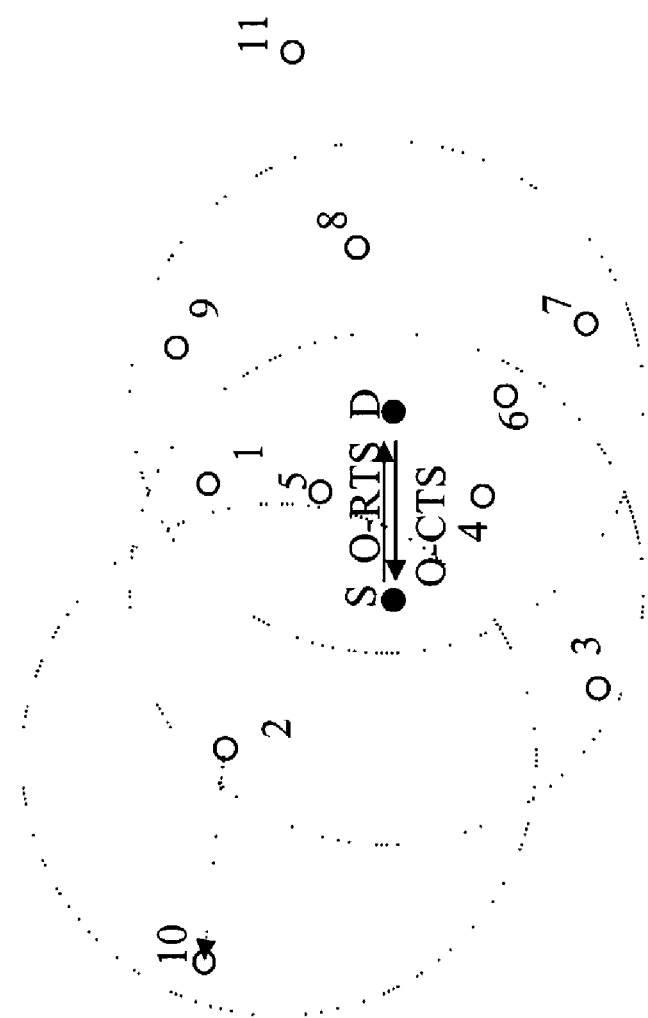
Figure 2:
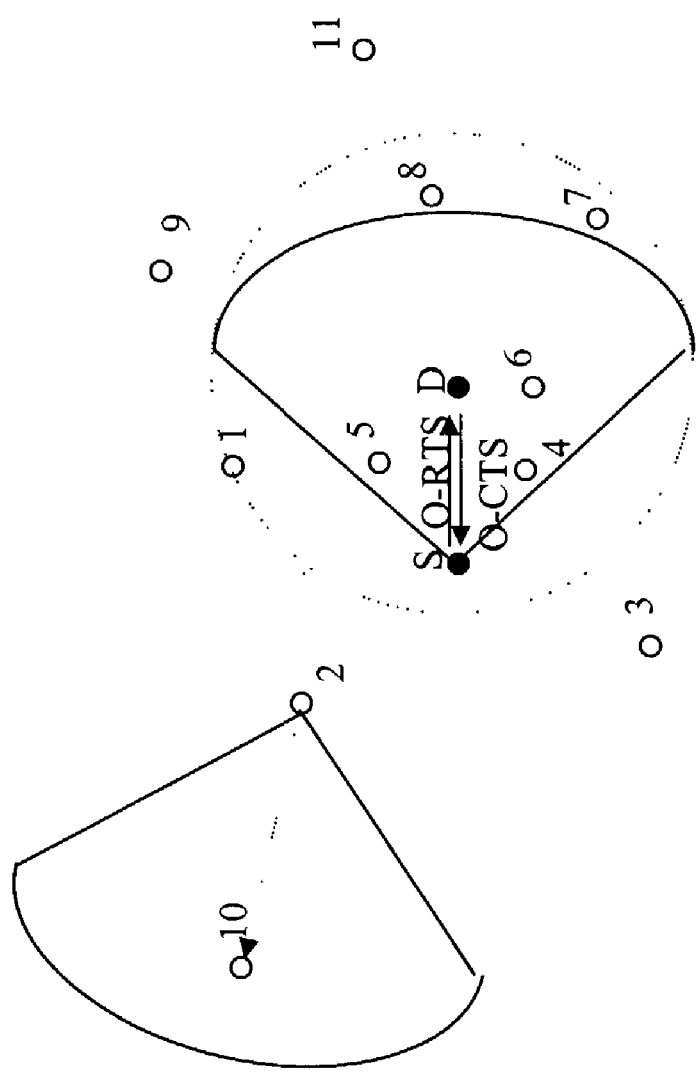
Figure 3:
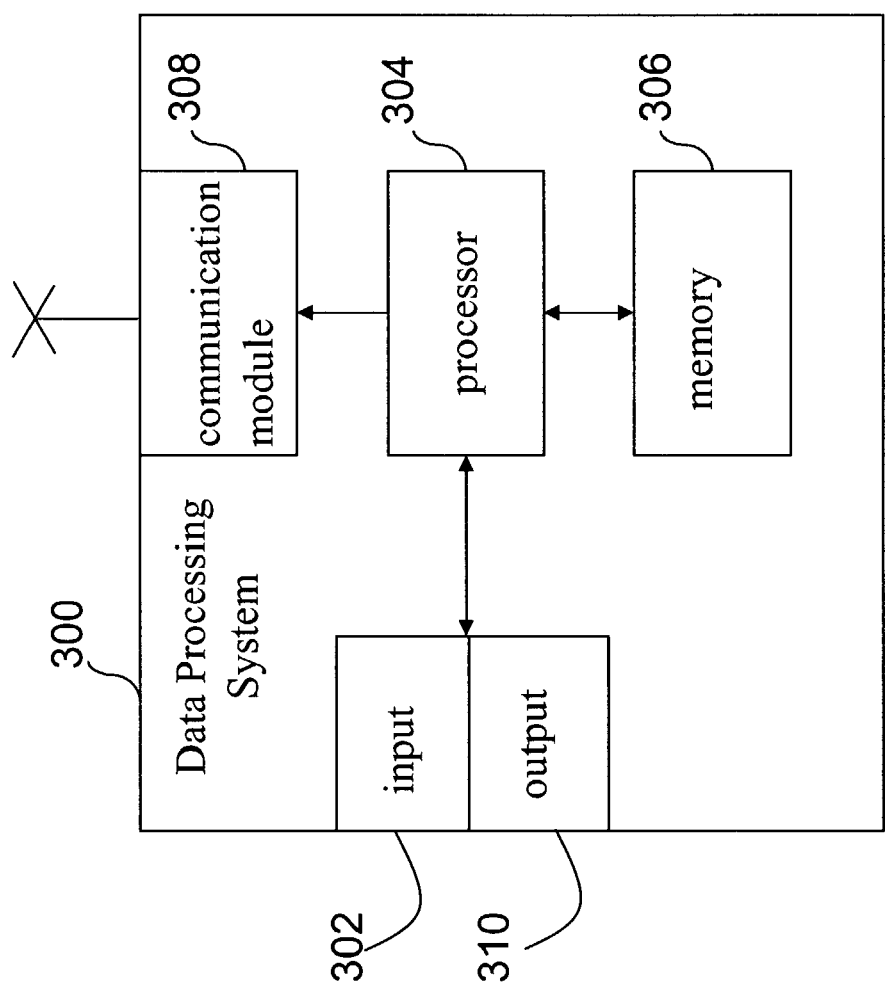
Figure 4:
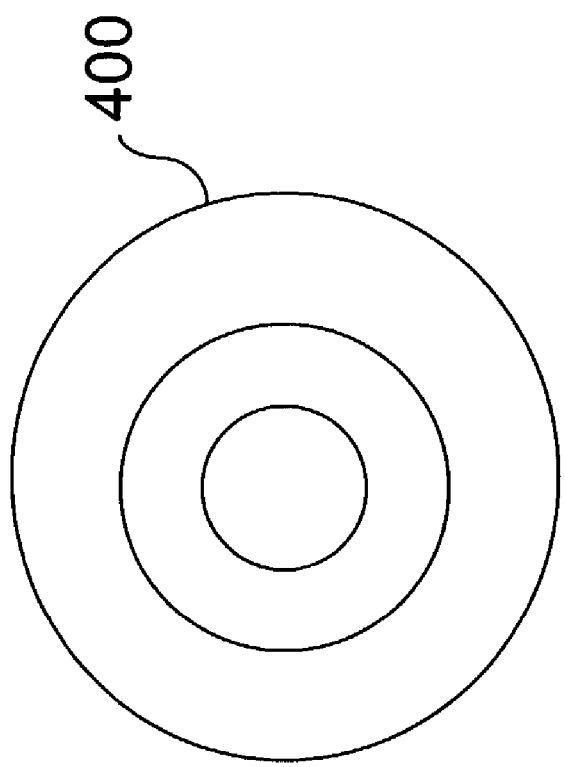
Figure 5:
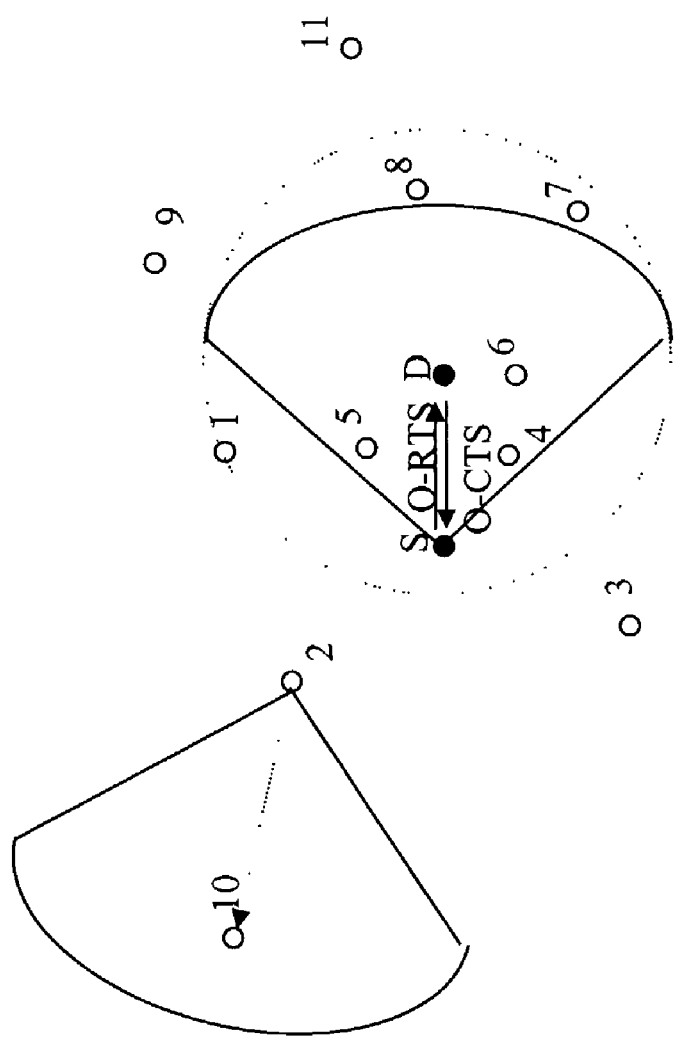
Figure 6:
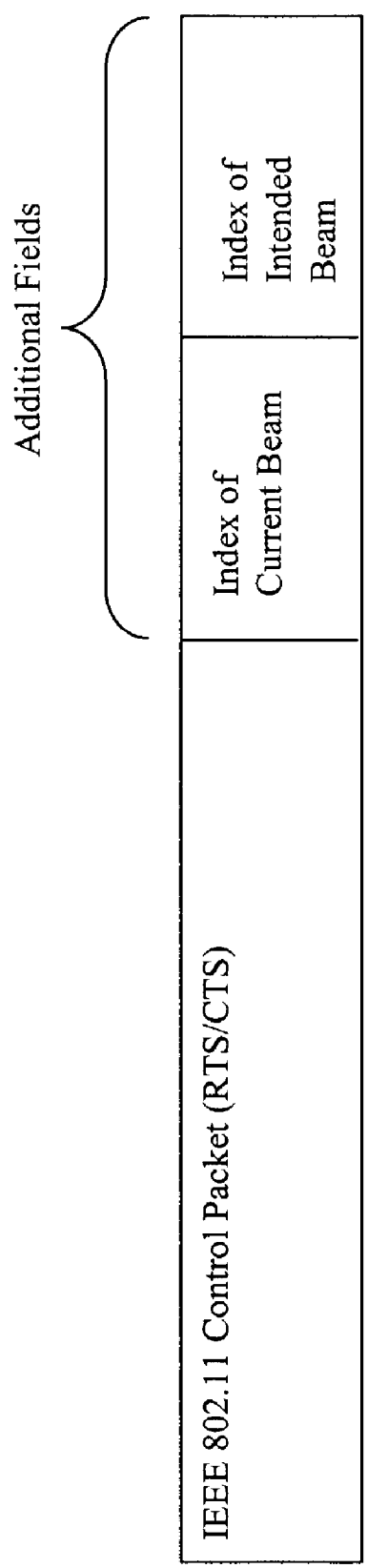
Figure 7:
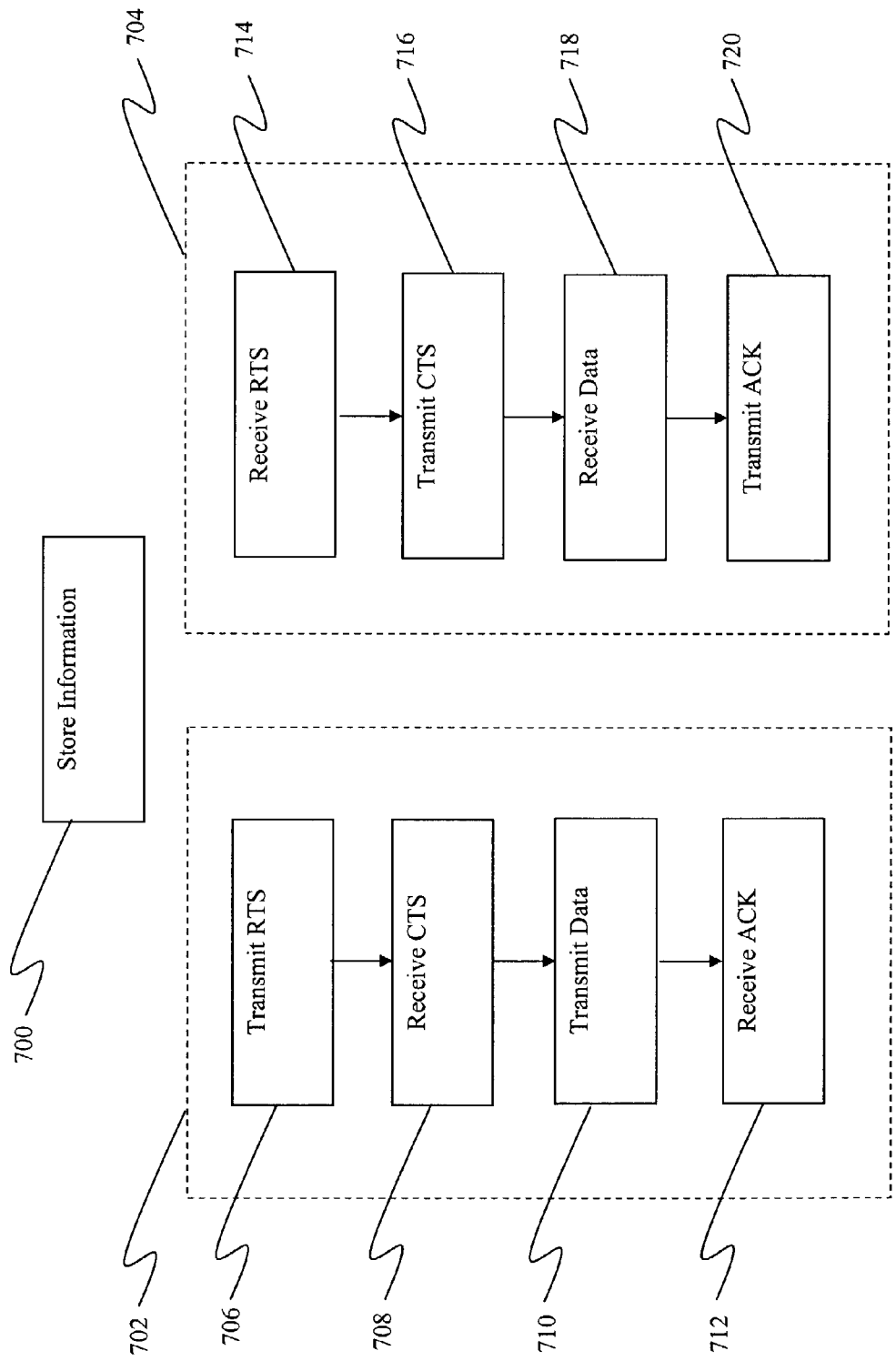

FIG. 1 is an illustrative diagram depicting a plurality of nodes communicating using omni-directional signaling;

FIG. 2 is an illustrative diagram depicting a plurality of nodes communicating using directional signaling;

FIG. 3 is a block diagram of the computer system used as a node in the context of the present invention;

FIG. 4 is an illustrative diagram of a computer program product of the present invention;

FIG. 5 is an illustrative diagram depicting a plurality of nodes communicating according to the present invention;

FIG. 6 is an illustrative diagram of the packet structure designed for use with the present invention; and FIG. 7 is a block diagram depicting the various functions of the apparatus.

DETAILED DESCRIPTION

The present invention relates to a technique for network communications. More specifically, the present invention relates to the use of directional communication nodes that send communication signals in specific directions to minimize interference with those of other nodes. The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles defined herein, may be applied to a wide range of aspects. Thus, the present invention is not intended to be limited to the aspects presented, but is to be accorded the widest scope consistent with the principles and novel features disclosed herein. Furthermore it should be noted that unless explicitly stated otherwise, the figures included herein are illustrated diagrammatically and without any specific scale, as they are provided as qualitative illustrations of the concept of the present invention.

Intended Direction of Transmission—This term refers to the index of the directional beam to be used to send data or acknowledgement packets to an intended neighbor. The information regarding which beam to use to reach a specific neighbor is determined through the use of a neighborhood location discovery (NLD) scheme. A field is added to the reservation packet to store the index of the directional beam currently being used for data or acknowledgement transmission. This information is used by each neighbor to know its relative location with respect to the source and destination nodes so that they can make appropriate beam blocking decisions.

Means—The term "means" as used with respect to this invention generally indicates a set of operations to be performed on a computer. Non-limiting examples of "means" include computer program code (source or object code) and "hard-coded" electronics. The "means" may be stored in the memory of a computer or on a computer readable medium.

(2) Physical Aspects

The present invention has three principal "physical" aspects. The first is a node that sends handshake signals to other nodes in specific directions in order to minimize interference with those of other nodes. The node is typically in the form of a computer system with a directional antenna, operating software or in the form of a "hard-coded" instruction set to facilitate the communication process. The system is designed to take advantage of its directional antennas in order to minimize packet collisions, thus increasing the throughput. The second principal aspect is a method, or protocol, for ensuring effective communication between nodes. Typically, the method is embodied as software operating on a data processing system (e.g., a computer). The third principal physical aspect is a computer program product. The computer program product generally represents computer readable code stored on a computer readable medium such as an optical storage device, e.g., a compact disc (CD) or digital versatile disc (DVD), or a magnetic storage device such as a floppy disk or magnetic tape. Other, non-limiting examples of computer readable media include hard disks, read only memory (ROM), and flash-type memories. These aspects will be described in more detail below.

A block diagram depicting the components of a computer system (i.e., a node) used in the present invention is provided in FIG. 3. The computer system 300 generally, but not necessarily, comprises an input 302 for receiving information from a user or other source (e.g., a keyboard, a mouse, a remote database, a network connection, etc.). The input 302 is connected with a processor 304, which is, in turn, connected with a memory 306. The processor 304 may be a general-purpose computer processor or a specialized processor designed specifically for use with the present invention. The processor is coupled with the memory 306 to permit storage of data and software to be manipulated by commands to the processor as well as data to be transmitted to other computer systems. The processor 304 is also coupled with an output to provide output reflective of the operations on the data in the subband domain. The processor 304 is further connected with a communication module 308, such as a directional antenna or a directional IR transmitter/receiver for communicating with other computer systems (nodes). An output 310 may also be provided and coupled with the processor 304 to provide output to a user, typically in the form of a monitor or a connection for coupling the computer system 302 to peripheral devices.

An illustrative diagram of a computer program product embodying the present invention is depicted in FIG. 4. The computer program product 400 is depicted as an optical disk such as a CD or DVD. However, as mentioned previously, the computer program product generally represents computer readable code stored on any compatible computer readable medium.

(3) Introduction

The present invention provides an apparatus, a method, and a computer program product to facilitate a multiple access protocol for wireless ad-hoc networks using switched-beam antennas. The goals of the present invention include striking a balance between minimizing the two conflicting requirements of unnecessary blocking of neighbors and packet collisions; deciding whether a node should transmit or refrain from transmitting does not depend on the mere event of receiving or not receiving a reservation (RTS/CTS) packet (the decision instead depends on "directional information"); sending reservation packets in all possible directions, even if data is to be sent in a specific direction; and including "directional information" as additional information in the RTS/CTS packets.

During network operation, nodes are expected to exchange reservation packets, namely request to send packets (RTS) and clear to send packets (CTS), prior to data transmission in a manner similar to the class of CSMA/CA protocols. However, in the case of the present invention, the contents of these reservation packets further include information about the direction of reservation and the intended direction of data transmission. Under the proposed scheme, a node sending an RTS packet first checks if it can send the RTS packet on all beams. If not, it sends it on all unblocked beams as long as the beam needed for carrying out data transmission is unblocked. A node hearing the RTS packet responds with a CTS packet if it is the intended destination; otherwise, it blocks one or more beams depending on its location relative to the source node. At the destination node, transmission of a CTS packet is attempted on all unblocked beams in order to notify as many neighbors as possible. A node receiving a CTS packet reacts in a manner similar to that described earlier for RTS packets. If it is not the source node, it will block one or more beams depending on its location relative to the destination node. Otherwise, it will proceed with sending the data on the beam pointing toward the destination. A salient feature of the proposed technique is that it attempts to optimally partition the set of neighbors into blocked and unblocked groups, where a node belongs to the blocked group if and only if its direction of transmission conflicts with the ongoing direction of transmission. Otherwise, a node belongs to the unblocked group of neighbors.

The present invention efficiently utilizes the interference-reduction feature of directional antennas. This technique is motivated by the fact that multiple access protocols developed for wireless ad-hoc networks using omni-directional antennas do not fully exploit the advantages of directional antennas. Moreover, initial work on modifying the class of CSMA/CA protocols for use with directional antennas focused on eliminating unnecessary blocking of nodes without paying much attention to minimizing collisions caused by neighbors unaware of the ongoing transmission. Therefore, an important objective of the present invention is to provide a new CSMA/CA-based multiple access protocol for ad-hoc networks supported with directional antennas such as switched beam antennas. As discussed in the background, the two handshaking extremes, namely omni-directional handshaking and directional handshaking, are inefficient. The concept of "omni-directional handshaking with directional information" is introduced here as a solution to these inefficiencies. In the present invention, the decision of transmitting or not transmitting in a specific direction is not based on the mere event of receiving or not receiving a reservation packet (e.g. RTS/CTS). Reservation packets should be sent omni-directionally, if possible, in order to reach the maximum number of neighbors and make them aware of the attempted transmission. The decision taken by a neighbor to transmit or not to transmit in a specific direction is based on the following information: i) the location of the transmitting neighbor, ii) the neighbor's "current" direction of reservation, and iii) the node's intended direction of data transmission. Accordingly, it is desirable that the RTS/CTS packets contain two additional fields to incorporate this information.

(4) Discussion

(a) Technique Description

The present invention takes advantage of the features of directional antennas mentioned in the background. Many possible schemes using combinations of omni-directional and directional antennas (communication modules) are possible, but the main problem is developing a scheme that optimizes the trade-off between minimizing the number of neighbors blocked from transmission and minimizing the number of collisions due to neighbors unaware of an ongoing transmission.

A main feature of the present invention is that, for ad-hoc networks using switched beam antennas, the RTS/CTS channel reservation packets are not transmitted in the direction of the intended destination only, they are transmitted in all unblocked directions so that they reach the maximum number of neighbors, while carrying information about the direction of the intended data transmission. Switched beam antennas are one of the simplest mechanisms for achieving directionality. A switched beam antenna consists of multiple fixed beams that are formed using antenna arrays and a beam forming network. The transceiver can choose between beams for transmitting or receiving via semiconductor switches. Switched beam antennas provide the interference reduction and range extension features of directional antennas; however, they can not track mobile nodes or estimate direction of arrival like steerable antennas. It is important to note that although switched beam antennas are desirable, any directional communication mechanism may be employed, and need not be limited to radio frequency (RF) transmission/reception. For example, infrared transmitters and receivers may be employed, or a hybrid of infrared and RF may be employed. An important goal of the present invention is to balance the trade-off between minimizing the number of blocked neighbors (which favors directional handshaking) and minimizing the number of collisions caused by neighbors unaware of the ongoing transmission (which favors omni-directional handshaking). The proposed technique makes all neighbors aware of an expected transmission in order to minimize collisions, while at the same time informing them of the intended direction of the transmission so that they may proceed with their transmission if it does not cause conflicts.

First, some of the notations and definitions, in addition to those mentioned in the background are introduced. The present invention introduces the concept of "Omni-directional Reservation with Directional Information" where all neighbors are provided with information about the intended direction of transmission. This allows the nodes to decide, autonomously, when to proceed with a transmission and when to refrain from transmitting. This approach incorporates the following principles:

- All neighbors of the source and the destination nodes are made aware of the intended transmission.
- Neighbor blocking is based on the information included in the RTS/CTS packets, not on the mere event of receiving or not receiving a channel reservation packet.
- Source and destination nodes should adopt the same strategy for channel reservation. This is because both are subject to collisions from unblocked neighbors (i.e. the source node may suffer control packet collisions, whereas the destination node may suffer data packet collisions).

In the technique presented, referring to the nodes shown in FIG. 5, node S sends an O-RTS (omni-directional request to send) packet to all of its neighbors to inform them that it wishes to initiate a transmission with node D. Thus, neighboring node 5 would know that it lies within the intended direction of data transmission from S to D, and therefore would block all its antennas from transmission. On the other hand, node 2 would know that it is out of the intended direction of data transmission from S to D. Hence, it blocks only the beam pointing toward node S. Moreover, node 2 would know that it can initiate a transmission with node 10 since it would use a different beam from the one pointing toward S, and thus it will not cause any interference at node S and will not suffer any interference from S. Hence, the proposed approach is able to block node 2 (i.e. node 2 would belong to the set BN(S)), if it is transmitting toward node S, and at the same time allows transmissions from node 2 in any other direction (i.e. node 2 would belong to the set UBN(S)). This is based on utilizing information passed to the neighbors through the O-RTS/O-CTS messages. It is worth noting that similar arguments can be made for the destination node D as well.

The RTS/CTS-based handshake protocol of the present invention efficiently partitions neighbors into blocked and unblocked groups, unlike the inefficient omni-directional and directional blocking extremes. In a case where the communication module is a set of switched beam antennas, it is assumed that a node x is supported by a fixed number ($M_x$) of switched beam antennas. In addition, it is assumed that nodes receive omni-directionally, i.e. signals received by all beams are utilized, via diversity combining techniques, examples of which may be found in "Radiowave Propagation and Smart Antennas for Wireless Communications" by R. Janaswamy, incorporated herein by reference, in order to combat multi-path fading and scattering effects. It is further assumed that a node lying in a neighbor node's direction of data transmission would be blocked from transmission on all of its directional beams. This is justified by the considerable interference levels it could suffer while combining signals from all beams, which would be further aggravated by multi-path fading. This is a conservative assumption that can be relaxed (i.e. some of the antennas may be unblocked) in an open environment, where multi-path fading is not a challenge, depending on the signal-to-interference-and-noise-ratio (SINR) levels measured on different beams. Finally, it is assumed that each node x has the following information about its neighbors from the use of neighbor location discovery (NLD) schemes:

- The unique identities of all neighbors of node x, stored in the vector N(x).
- The identities of neighbors that lie within the coverage of directional antenna j onboard node x, stored in the vector $DN_x(j)$.

Thus, each node keeps an up-to-date version of the aforementioned set of data structures along with the status of each beam as blocked or unblocked. Hence, by the end of the NLD phase, each node knows which beam to use in order to reach a specific neighbor. Generating or selecting a specific NLD algorithm that efficiently utilizes the range extension feature of the particular communication modules used is considered to be a routine task to be performed in the development of a specific aspect. As mentioned, for illustrative purposes, this discussion focuses on the case of nodes supported with fixed switched beam antennas. As an illustration, this provides for a coherent discussion of the various design choices involved, along with their associated trade-offs. Adapting the present invention for use with more complex steerable beam antennas or other communication module types is considered routine work in application of the present invention to a specific aspect. In order to strike a balance between packet collisions and the number of simultaneous transmissions, the handshake-based multiple access protocol for wireless ad-hoc networks according to the present invention (in the specific case of switched beam antennas) has the following features:

Channel reservation packets (RTS/CTS) are transmitted in all possible directions.

The channel reservation packets preferably include information about the "current" and "intended" direction of transmission.

The pieces of information that are already included in conventional RTS/CTS packets and that are useful in conjunction with the present invention are the source node identity and the destination node identity. In addition, the two fields that store information about the intended direction of transmission and current direction of transmission, respectively, are added. More precisely, these two fields store the index of the directional beam intended to be used during data and acknowledgement transmission and the index of the directional beam currently being used during channel reservation, and they generally have different values. The values become equal if and only if the neighboring node lies within the node's intended direction of data transmission. This optimal balance is achieved through the use of directional antennas. This information is important to ensure that each neighbor knows its relative location with respect to the source and destination nodes, and hence, to ensure that appropriate antenna blocking decisions are made. Finally, any node that receives a handshake packet should store the index of the beam pointing toward the transmitter in order to update its antenna blocking information. In summary, the following information is important for the protocol to operate optimally: the source node ID; the destination node ID; the index of directional beam pointing toward the transmitting neighbor; the index of the directional beam to be used during data and acknowledgement transmissions (denoted Intended_Beam); and the index of the directional beam currently used by the transmitting neighbor during channel reservation (denoted Curr_Beam). The general packet structure used for this purpose is depicted in FIG. 6.

The prime motivation for adding the latter two fields to the handshake packets is to decouple the event of receiving a handshake packet from blocking a node/or antenna from transmission. All neighbors should receive the handshake reservation packets, the decision to transmit on a specific beam depends solely on the direction along with the information included in the handshake packet. In order to help understand the behavior of a node during channel reservation, the following pseudocode is presented:

Node sending an RTS packet
if(All beams are unblocked)
   Send RTS packet on all beams
else if(The node wishes to transmit on one of the unblocked beams)
   Send RTS packet on all unblocked beams
else
   The node refrains from sending the RTS packet until the ongoing transmission is completed
Node hearing an RTS packet

```
if(RTS(Dest_ID) == My_ID)
{
Store information from RTS packet
Modify the state of the beam pointing toward the source to "Blocked"
Send CTS packet
}
```

-continued

```
else if(RTS(Curr_Beam) == RTS(Intended_Beam))
{
Store information from RTS packet
Modify the state of all beams to "Blocked"
}
else
{
Store information from RTS packet
Modify the state of the beam pointing toward the cource to "Blocked"
}
```

Node sending a CTS packet
if(All beams are unblocked)
   Send CTS packet on all beams
else
   Send CTS packet on all unblocked beams
Node hearing a CTS packet

```
if(CTS(Src_ID) == My_ID)
{
Store information from CTS packet
Send data on the beam pointing toward the destination
}
else if(CTS(Curr_Beam) == CTS(Intended_Beam))
{
Store information from CTS packet
Modify the state of all beams to "Blocked"
}
else
{
Store information from CTS packet
Modify the state of the beam pointing toward the destination to "Blocked"
}
```

As illustrated above, one of the salient features of the technique presented herein is transmitting the channel reservation packets on all beams, if possible, or at least on all unblocked beams in order to notify the maximum number of neighbors. However, when a beam that was blocked at the time of reservation becomes unblocked due to the completion of a neighboring transmission, the node could suffer interference caused by a neighbor who is not aware of the reservation made earlier. To better illustrate this problem, consider the set of nodes presented before in FIG. 5, with the following scenario. Assume that node 2 is currently transmitting to node 10, and hence the beam at node S pointing toward 2 is blocked from transmission. If node S wishes to initiate a transmission to node D, it proceeds by sending the RTS packet on all unblocked beams, namely all beams except for the one pointing at node 2. Thus, neighbors of S who are covered by the same beam pointing toward node 2 are not aware of the reservation just made by node S. Assume that the transmission from node 2 to node 10 has successfully completed. Thus, the beam at node S pointing toward node 2 became unblocked and hence was exposed to interference from node 2 or any other neighbor within its coverage. In order to solve this problem, the transmission from S to D should, in accordance with the present invention, be halted for a short period of time so that node S can transmit a dedicated RTS packet on the beam recently unblocked, namely the beam pointing toward node 2. This is essential to make this subset of neighbors aware of the ongoing transmission between S and D. Once the RTS packet is sent, node S can resume its transmission on the beam pointing toward node D. This approach is feasible because of the short amount of time needed to send a control packet, which can be tolerated by the data packet transmission. If the transmitter allows transmitting different packets on different beams at the same time, this feature can be exploited in order to send the RTS packet on the recently unblocked beam while the node, at the same time, continues to send the data on the beam pointing toward the destination. Solving this problem reduces collisions and hence further improves the MAC throughput.

A block diagram depicting the various functions of the apparatus is presented in FIG. 7. This diagram is intended to provide an overview of the functions performed by a node, and is a block diagram representation of the pseudocode presented above. One of the functions of the node is to store information regarding the identities of and directions to each neighbor nodes as well as the identity of the apparatus, as represented by function block 700. In the figure, the functions are divided into two groups, those involved in transmission of data 702 and those involved in reception of data 704. When a node desires to transmit data, first it transmits an RTS packet 706. The RTS packet is sent on all unblocked beams of the node's directional antenna, i.e., if all beams are unblocked, the transmission is omni-directional. Note that the node refrains from sending the RTS packet until the ongoing transmission is completed. After the node has transmitted the RTS packet, it waits to receive a CTS packet 708 prior to transmitting data. If the node receives a CTS packet 708 indicating that it can transmit its data, the node first stores the information contained in the CTS packet and ensures that it is the node that has been cleared to transmit. If node identity in the CTS packet matches the current node's identity, then the node transmits data on the beam pointing toward the destination 710. If the current beam identified in the CTS packet is the same as the intended beam identified in the CTS packet, the node sets all of its beams to "blocked" for a predetermined amount of time to ensure the node transmitting data may transmit free from interference. In any event, the node sets its beam that points toward the destination indicated in the CTS packet to "blocked". If the node transmitted data, it awaits an acknowledgement (ACK) packet 712, the receipt of which indicates that the communication is complete.

In the process of receiving data, the node first receives an RTS packet 714. If the current node is the intended destination of the data transmission, it stores the information from the RTS packet and modifies the state of the beam pointing toward the source to "blocked". It then sends a CTS packet 716 to indicate that the node is clear to send data. If the current beam indicated in the RTS packet is the same as the intended beam indicated in the RTS packet, the node stores the information from the RTS packet and modifies the state of all of its beams to "blocked". Otherwise, the node stores the information from the RTS packet and modifies the state of the beam pointing toward the source node to "blocked". If the node is the intended receiver of a data transmission, the node next receives the data from the source node 718, and upon completion of its receipt of the data, the node transmits an acknowledgement packet 720.

Although the assumption of non-overlapping switched beams is useful in concept, real switched beam antennas experience some overlapping between them due to coverage constraints. As discussed, the technique involves two phases, omni-directional channel reservation and directional data or acknowledgement transmissions. Since the data and acknowledgement transmissions are directional, i.e. one beam is used at a time, overlapping beams do not have any impact on this phase. On the other hand, omni-directional transmission is achieved by transmitting over all directional beams, and hence, this phase is affected by the beams experience overlapping. The following techniques for handling interference caused by overlapping beams may be used on different layers of the open systems interconnect (OSI) hierarchy:

Antenna design—There is an inherent tradeoff between the coverage of the directional beam and the degree of overlap between beams. On one hand, maximum coverage by a beam requires some degree of overlap between beams. On the other hand, minimizing the beam overlap can be achieved at the expense of coverage. Therefore, these tradeoffs have to be balanced in an antenna designed for use with the present invention, and the balance achieved depends on the system objectives and constraints. If beam overlap is minimized in a particular system (subject to a constraint on beam coverage), then the technique presented herein will not require any modification since the probability of neighbors lying within the coverage of the overlapped beams would be minimum, and thus, would have a minimal impact on performance. On the other hand, if beam overlap is allowed, due to coverage requirements, then it can be handled in either of the ways described below.

(1) Physical layer algorithms—Nodes in the region covered by the overlapping beams could benefit from the "capture" technique that enables extracting the desired signal from interference under the condition that the received signal power is greater than the interference power. Thus, a node lying in the region covered by two overlapping beams could receive two interfering reservation messages simultaneously. However, if the two messages are received at different powers, then it could successfully detect the stronger signal despite the interference. The power of the signals received from different beams may vary due to the differences in the transmission gains and multi-path fading. In the case where the two signals are received at exactly the same power, which seldom happens, then the capture algorithm would fail to distinguish between signal and interference.

(2) Proposed MAC algorithm—The present invention can easily be modified to handle the effect of overlapping beams. One way this may be achieved is by indexing the directional beams from 1 to M. Motivated by the fact that beams' overlapping decreases significantly as the distance between the transmitting nodes increases (i.e. beams from neighboring nodes experience more overlapping than those from non-neighboring nodes), omni-directional reservations, i.e. transmissions on all unblocked beams, can be carried out over the course of K phases, where $2 \leq K \leq M$. At one extreme, K=2, the first phase will be dedicated for transmissions on the odd-numbered beams, while in the second phase, transmissions are allowed on the even-numbered beams. By doing so, the algorithm prevents any two neighboring beams from transmitting simultaneously. At the other extreme, where K=M, transmission over each beam takes place separately in a round-robin fashion in order to eliminate the effect of overlapping between any two beams. According to this technique, a node lying within the region where the beams overlap could receive two or more successive non-interfering reservation messages (one in each phase). Depending on the quality of the received signal (i.e. SNR or received power), the receiver would be able to decide which beam to receive from and which to ignore.

Another "practical" issue to note is the potential for backfire, the amount of energy that spills in the backward direction from a directional antenna transmitting in the forward direction. Existing antenna technology supports forward to backward power ratios at least as high as 30 dB by controlling the radiation intensity of the major, minor, and back lobes. This, in turn, means that the amount of interference caused in the backward direction would be negligible compared to an intended transmission (i.e. the signal-to-interference-and-noise ratio can still be maintained above a desired threshold, despite backward energy spills). Therefore, the effect of the backfire phenomena on the utility of the present invention is generally negligible. The performance degradation can be minimized to tolerable levels by designing the directional antennas to maximize the forward/backward ratio by increasing the number of elements, by using a ground back plane, or by using a power distribution over various elements by controlling their respective amplifiers/attenuators.

What is claimed is:

1. An apparatus for selective directional wireless communication comprising a computer system including a processor, a memory coupled with the processor, a directional communication module, connected with the processor, for receiving communication signals and for transmitting communication signals in any of a plurality of directions which may be blocked or unblocked, and wherein the computer system further comprises means, residing in its processor and memory, for:

storing information including identities of and directions to each neighbor node, and an identity of the apparatus;

transmitting in all unblocked directions, via the directional communication module, a request-to-send signal including a source node identity and a destination node identity, with the source node identity consisting of the identity of the apparatus, the request-to-send signal indicating a start of a transmission;

receiving, via the directional communication module, a clear-to-send signal corresponding to a transmitted request-to-send signal indicating whether to start a data transmission;

transmitting, when indicated to do so by the clear-to-send signal, a data transmission corresponding to the transmitted request-to-send signal, in the direction corresponding to the destination node identity;

receiving, an acknowledgement signal upon completion of the data transmission;

receiving, via the directional communication module, a request-to-send signal including a source node identity and a destination node identity, and determining whether the apparatus is the destination node;

determining after receipt of a request-to-send signal, and when the apparatus is not the destination node, whether the source node or the destination node are within a communication range of the apparatus, and when the source node is within the communication range of the apparatus, blocking communication signals in the direction of the source node for a predetermined period of time; and when the destination node is within the communication range of the apparatus, blocking communication signals in the direction of the destination node for a predetermined period of time;

transmitting in all unblocked directions, when the apparatus is the destination node, a clear to send signal corresponding to a transmitted request-to-send signal indicating whether to transmit a data transmission;

receiving, when a data transmission was permitted by the transmitted clear-to-send signal, a data transmission corresponding to the received request-to-send signal; and transmitting in all unblocked directions, an acknowledgement signal either upon completion of the data transmission or after sending a clear-to-send signal indicating not to send a data transmission.

2. An apparatus for selective directional wireless communication as set forth in claim 1, wherein the directional communication module is selected from a group consisting of radio frequency antennas and infrared transceivers.

3. An apparatus for selective directional wireless communication as set forth in claim 1, wherein the information stored further comprises an index of a directional beam to be used during data transmission and acknowledgement transmission, and an index of a directional beam used by a transmitting neighbor during channel reservation.

4. A method for selective directional wireless communication, the method operating on a computer system including a processor, a memory coupled with the processor, a directional communication module, connected with the processor, receiving communication signals and for transmitting communication signals directionally over any of a plurality of directions which may be blocked or unblocked, wherein the method comprises steps of:

storing information including identities of and directions to each neighbor node, and an identity of the current node;

transmitting in all unblocked directions, via the directional communication module, a request-to-send signal including a source node identity and a destination node identity, with the source node identity consisting of an identity of the apparatus, the request-to-send signal indicating a start of a transmission;

receiving, via the directional communication module, a clear-to-send signal corresponding to a transmitted request-to-send signal indicating whether to start a data transmission;

transmitting, when indicated to do so by the clear-to-send signal, a data transmission corresponding to the transmitted request-to-send signal, in the direction corresponding to the destination node identity;

receiving, an acknowledgement signal upon completion of the data transmission;

receiving, via the directional communication module, a request-to-send signal including a source node identity and a destination node identity, and determining whether the apparatus is the destination node;

determining after receipt of a request-to-send signal, and when the apparatus is not the destination node, whether the source node or the destination node are within a communication range of the apparatus, and when the source node is within the communication range of the apparatus, blocking communication signals in the direction of the source node for a predetermined period of time; and when the destination node is within the communication range of the apparatus, blocking communication signals in the direction of the destination node for a predetermined period of time;

transmitting in all unblocked directions, when the apparatus is the destination node, a clear to send signal corresponding to a transmitted request-to-send signal indicating whether to transmit a data transmission;

receiving, when a data transmission was permitted by the transmitted clear-to-send signal, a data transmission corresponding to the received request-to-send signal; and transmitting in all unblocked directions, an acknowledgement signal either upon completion of the data transmission or after sending a clear-to-send signal indicating not to send a data transmission.

5. A method for selective directional wireless communication as set forth in claim 4, wherein the directional communication module used in the performance of the method is selected from a group consisting of radio frequency antennas and infrared transceivers.

6. A method for selective directional wireless communication as set forth in claim 4, wherein the information stored in the information storing step further comprises an index of a directional beam to be used during data transmission and acknowledgement transmission, and an index of a directional beam used by a transmitting neighbor during channel reservation.

7. A computer program product for selective directional wireless communication, the computer program product comprising computer readable instructions on a computer-readable medium to be used on an apparatus including computer system including a processor, a memory coupled with the processor, a directional communication module, connected with the processor, receiving communication signals and for transmitting communication signals directionally over any of a plurality of directions which may be blocked or unblocked, and wherein the computer program product comprises means, stored on a computer readable medium, for:

storing information including identities of and directions to each neighbor node, and an identity of the current node;

transmitting in all unblocked directions, via the directional communication module, a request-to-send signal including a source node identity and a destination node identity, with the source node identity consisting of an identity of the apparatus, the request-to-send signal indicating a start of a transmission;

receiving, via the directional communication module, a clear-to-send signal corresponding to a transmitted request-to-send signal indicating whether to start a data transmission;

transmitting, when indicated to do so by the clear-to-send signal, a data transmission corresponding to the transmitted request-to-send signal, in the direction corresponding to the destination node identity;

receiving, an acknowledgement signal upon completion of the data transmission;

receiving, via the directional communication module, a request-to-send signal including a source node identity and a destination node identity, and determining whether the apparatus is the destination node;

determining after receipt of a request-to-send signal, and when the apparatus is not the destination node, whether the source node or the destination node are within a communication range of the apparatus, and when the source node is within the communication range of the apparatus, blocking communication signals in the direction of the source node for a predetermined period of time; and when the destination node is within the communication range of the apparatus, blocking communication signals in the direction of the destination node for a predetermined period of time;

transmitting in all unblocked directions, when the apparatus is the destination node, a clear to send signal corresponding to a transmitted request-to-send signal indicating whether to transmit a data transmission;

receiving, when a data transmission was permitted by the transmitted clear-to-send signal, a data transmission corresponding to the received request-to-send signal; and transmitting in all unblocked directions, an acknowledgement signal either upon completion of the data transmission or after sending a clear-to-send send signal indicating not to send a data transmission.

8. A computer program product for selective directional wireless communication as set forth in claim 7, wherein the directional communication module is selected from a group consisting of radio frequency antennas and infrared transceivers.

9. A computer program product for selective directional wireless communication as set forth in claim 8, wherein the information stored further comprises an index of a directional beam to be used during data transmission and acknowledgement transmission, and an index of a directional beam used by a transmitting neighbor during channel reservation.

* * * * *

UNITED STATES PATENT AND TRADEMARK OFFICE
CERTIFICATE OF CORRECTION

PATENT NO.       : 7,075,902 B2                                Page 1 of 2
APPLICATION NO. : 10/293213
DATED            : July 11, 2006
INVENTOR(S)      : Tamer El Batt It is certified that error appears in the above-identified patent and that said Letters Patent is hereby corrected as shown below:

The following section of text, beginning at Column 7, Line 45 and ending at column 8, line 12 of the BRIEF DESCRIPTION OF THE DRAWINGS, is misplaced. This section should be removed from its current location and inserted at Column 8, line 52 of the DETAILED DESCRIPTION, following the paragraph ending in "...illustrations of the concept of the present invention.", and preceding the paragraph beginning with "Intended Direction of Transmission...":

--In order to provide a working frame of reference, first a glossary of terms used in the description and claims is given as a central resource for the reader. Next, a discussion of various physical aspects of the present invention is provided. Finally, a discussion is provided to give an understanding of the specific details.
(1) Glossary
Before describing the specific details of the present invention, a centralized location is provided in which various terms used herein and in the claims are defined. The glossary provided is intended to provide the reader with a general understanding of the intended meaning of the terms, but is not intended to convey the entire scope of each term. Rather, the glossary is intended to supplement the rest of the specification in more accurately explaining the terms used.
Communication Module – The communication module of the present invention refers generally to a mechanism for transmitting messages between nodes. Typically, the communication module is in the form of a radio-frequency (RF) antenna or an infrared (IR) transmitter/receiver, though other types of wireless communication mechanisms may be used depending on the requirements of a particular aspect.
Current Direction of Transmission – This term refers to the index of the directional beam currently being used for sending the reservation (RTS and CTS) packets, as part of the reservation scheme. The information regarding which beam to use to reach a specific neighbor is determined through the use of a neighborhood location discovery (NLD) scheme. A field is added to the reservation packet to store the index of the directional beam to be used for channel reservation. This information is used by

UNITED STATES PATENT AND TRADEMARK OFFICE
CERTIFICATE OF CORRECTION

PATENT NO. : 7,075,902 B2
APPLICATION NO. : 10/293213
DATED : July 11, 2006
INVENTOR(S) : Tamer El Batt It is certified that error appears in the above-identified patent and that said Letters Patent is hereby corrected as shown below:

each neighbor to know its relative location with respect to the source and destination nodes so that they can make appropriate beam blocking decisions.--

Signed and Sealed this

Eighteenth Day of August, 2009

David J. Kappos
*Director of the United States Patent and Trademark Office*